(12) United States Patent
Taubenrauch et al.

(10) Patent No.: US 11,371,485 B2
(45) Date of Patent: Jun. 28, 2022

(54) HELICOPTER HOISTING PLATFORM FOR WIND DRIVEN POWER PLANT

(71) Applicant: ADWEN GMBH, Bremerhaven (DE)

(72) Inventors: Elmar Taubenrauch, Wurster Nordseeküste (DE); Dror Avner, Berlin (DE)

(73) Assignee: ADWEN GMBH, Bremerhaven (DE)

( * ) Notice: Subject to any disclaimer, the term of this patent is extended or adjusted under 35 U.S.C. 154(b) by 176 days.

(21) Appl. No.: 16/490,669

(22) PCT Filed: Mar. 7, 2018

(86) PCT No.: PCT/EP2018/055664
§ 371 (c)(1),
(2) Date: Sep. 3, 2019

(87) PCT Pub. No.: WO2018/162591
PCT Pub. Date: Sep. 13, 2018

(65) Prior Publication Data
US 2020/0011302 A1  Jan. 9, 2020

(30) Foreign Application Priority Data

Mar. 7, 2017 (EP) .................................. 17159683

(51) Int. Cl.
*F03D 13/40* (2016.01)
*F03D 80/50* (2016.01)
*F03D 80/80* (2016.01)
*E01F 3/00* (2006.01)

(52) U.S. Cl.
CPC ............... *F03D 13/40* (2016.05); *E01F 3/00* (2013.01); *F03D 80/50* (2016.05); *F03D 80/88* (2016.05)

(58) Field of Classification Search
CPC combination set(s) only.
See application file for complete search history.

(56) References Cited

U.S. PATENT DOCUMENTS 9,683,555 B2 * 6/2017 Arndt ...................... F03D 80/50
2011/0097202 A1 * 4/2011 de Buhr .................. F03D 80/50
                                                                    415/201

(Continued)

FOREIGN PATENT DOCUMENTS

DE 102013101239 A1 8/2014
EP 2466129 A2 6/2012

(Continued)

OTHER PUBLICATIONS

International Search Report and Written Opinion dated Jun. 1, 2018 for Application No. PCT/EP2018/055664.

(Continued)

*Primary Examiner* — Aaron R Eastman
(74) *Attorney, Agent, or Firm* — Schmeiser, Olsen & Watts LLP

(57) ABSTRACT

Provided is a helicopter hoisting platform for a nacelle of a wind driven power plant, wherein the helicopter hoisting platform includes a detachable portion that is configured to be detached and removed from a permanent portion of the helicopter hoisting platform. Also provided is a wind drive power plant including a nacelle and the helicopter hoisting platform.

14 Claims, 7 Drawing Sheets

(56) References Cited

U.S. PATENT DOCUMENTS

| | | | | |
|---|---|---|---|---|
| 2012/0282095 | A1* | 11/2012 | Munk-Hansen | F03D 80/60 |
| | | | | 416/95 |
| 2013/0142664 | A1* | 6/2013 | Kamibayashi | F03D 80/00 |
| | | | | 416/244 R |
| 2013/0315735 | A1* | 11/2013 | Arndt | F03D 80/00 |
| | | | | 416/146 R |
| 2014/0030111 | A1* | 1/2014 | Kohne | E06B 9/0676 |
| | | | | 416/244 R |
| 2014/0219801 | A1* | 8/2014 | Nyvad | F03D 80/80 |
| | | | | 416/95 |
| 2017/0022966 | A1* | 1/2017 | Therkildsen | B66C 13/16 |
| 2019/0203700 | A1* | 7/2019 | Numajiri | F03D 80/50 |
| 2019/0271297 | A1* | 9/2019 | Kruse | F03D 13/10 |

FOREIGN PATENT DOCUMENTS

| | | |
|---|---|---|
| KR | 101 411 532 B1 | 6/2014 |
| KR | 101411532 B1 | 6/2014 |
| KR | 2014 0100269 A | 8/2014 |
| KR | 20140100269 A | 8/2014 |
| WO | 2009132671 A2 | 11/2009 |
| WO | WO2009132671 A2 | 11/2009 |

OTHER PUBLICATIONS

EP Communication pursuant to Article 94(3) EPC dated Jul. 30, 2020 for Application No. 18 707 945.

* cited by examiner

HELICOPTER HOISTING PLATFORM FOR WIND DRIVEN POWER PLANT

CROSS-REFERENCE TO RELATED APPLICATIONS

This application claims priority to PCT Application No. PCT/EP2018/055664, having a filing date of Mar. 7, 2018, which is based on European Application No. 17159683.6, having a filing date of Mar. 7, 2017, the entire contents both of which are hereby incorporated by reference.

FIELD OF TECHNOLOGY

The following relates to a helicopter hoisting platform for a wind turbine.

BACKGROUND

Wind is one of the most important renewable energy technologies. Wind turbines (also referred to as wind driven power plants, wind turbine generators, or wind energy converters) are more and more arranged in large-scale offshore wind parks. There are many technical challenges relating to these offshore wind parks, as for example the assembly of parts and the transport, the erection of the wind turbine in the sea and the maintenance of the wind driven power plants.

WO 2009/132671 A2 discloses a wind energy installation having a nacelle with a paneling. The paneling is configured with a hatch opening that is arranged in the paneling covering surface. The hatch opening is sufficiently large in dimension to allow components to be removed or introduced in an upward direction from the top into the nacelle over the whole area of the drive train of the wind energy installation. The hatch opening can be opened and closed by a hatch cover that is configured to be slid as a whole along the top of the nacelle. A helicopter hoisting platform is provided on top of the nacelle and the cover is configured to slide below the hoisting platform in order to open the hatch.

SUMMARY

An aspect relates to an improved helicopter hoisting platform for a nacelle of a wind driven power plant having a hatch cover that allows the nacelle, the wind power installation or its parts to be easily transported, assembled and mounted, particularly for offshore wind parks.

According to an aspect, a helicopter hoisting platform for a nacelle of a wind driven power plant is provided. The helicopter hoisting platform comprises a permanent portion and a detachable portion. The detachable portion is configured to be detached and removed from the permanent portion of the helicopter hoisting platform. The permanent portion is configured to be permanently mounted and fixed to the nacelle. This provides an improved accessibility of the inside of nacelle, in particular for maintenance work, i.e. repair and replacement operations. Furthermore, portions of the helicopter hoisting platform can be mounted on top of access hatches/nacelle roof openings. Stated differently, the helicopter hoisting platform can be supported on the nacelle roof in an overlapping configuration such that the helicopter hoisting platform overlaps an opening cover and/or an opening in the roof of the nacelle.

A permanent connection is defined to be configured for single-time and/or permanent (or at least long lasting) engagement. Stated differently, the permanent connection is not constructed for a recurring engagement and disconnection.

A detachable connection is defined to be configured for recurring engagement and disconnection. Stated differently, the detachable connection is not constructed for single-time and/or permanent (or at least long lasting) engagement.

According to an advantageous aspect, the detachable portion and the permanent portion can cooperatively form a winching area (clear area) of the helicopter hoisting platform. In other words: The winching area can comprise a permanent portion that needs not to be removed before opening the nacelle roof. This eases access to the nacelle.

According to another advantageous aspect, the detachable portion and the permanent portion of the helicopter hoisting platform can each comprise a girder frame, a railing fence and/or a grating floor. This provides a lightweight helicopter hoisting platform having advantageous aerodynamic characteristics in helicopter downwash.

According to another advantageous aspect, wherein the detachable portion of the helicopter hoisting platform can comprise an access route area and a safety zone area. The different zones (areas) are required for safety reasons.

According to another advantageous aspect, the permanent portion can comprises the access route area and/or the safety zone area. This allows the safety zone area to be accessible even if the detachable part of the helicopter hoisting platform is removed.

According to another advantageous aspect, the helicopter hoisting platform can comprise an access hatch in the winching area. This aspect allows the helicopter hoisting platform to be substantially smaller than helicopter hoisting platforms that comprise the access hatch in a separate area.

Alternatively, the helicopter hoisting platform can comprise an access hatch in the access route area. This aspect allows the nacelle to be entered and/or exited during hoisting operations (e.g. during emergencies)

According to another advantageous aspect, the helicopter hoisting platform can comprise a supply hatch in the winching area. The supply hatch and tuck away deck cranes allow hoisted supplies and/or tools to be easily lowered into/lifted from the interior space of the nacelle.

According to another advantageous aspect, the hatches in the walking floor of the helicopter hoisting platform are configured to be floating hatches. Stated differently, there is no direct structural/mechanical connection between walls of the hatches and/or the hatch covers and the helicopter hoisting platform.

According to another advantageous aspect, the helicopter-hoisting platform can comprise connection means (platform interfaces) configured to form permanent connections with underlying roof panels of the nacelle. The platform interfaces provide tolerance compensation and level adjustment for the helicopter hoisting platform.

According to another advantageous aspect, the detachable portion can comprise connection means (platform interfaces), which are configured to form a permanent connection with an underlying detachable inner roof panel of the nacelle. This provides the detachable portion of the helicopter hoisting platform to be removed together with the underlying opening cover.

Alternatively, the detachable portion of the helicopter hoisting platform may solely comprise connection means configured to form a detachable connection with the permanent portion of the helicopter hoisting platform. The detachable portion is removed before removing the opening cover. Depending on the size of the detachable portion, the detachable portion may be stored on the surface of the permanent portion of the helicopter hoisting platform during lifting operations.

The following also provides a wind driven power plant comprising a nacelle and the helicopter hoisting platform according to aspects and embodiments of the invention.

According to an advantageous aspect, the nacelle can comprise an opening that can be closed by a removable opening cover. The removable opening cover and the detachable portion of the helicopter hoisting platform can be configured to provide an open space when detached and/or removed. The open space may particularly be defined by the shape and size of the opening. The open space can be adapted for inserting/removing a generator or a complete drive train of the wind driven power plant. This aspect improves accessibility of the inner space of the nacelle.

According to an advantageous aspect, the detachable portion can be permanently connected to one or more detachable roof panels of the nacelle. This aspect allows the detachable portion to be removed with the detachable roof panels in one lift.

The following also provides a wind park comprising a plurality of wind power driven power plants according aspects and embodiments of the invention. The following is particularly beneficial for offshore wind parks.

BRIEF DESCRIPTION OF DRAWINGS

Some of the embodiments will be described in detail, with references to the following Figures, wherein like designations denote like members, wherein.

DETAILED DESCRIPTION

Figure 1:
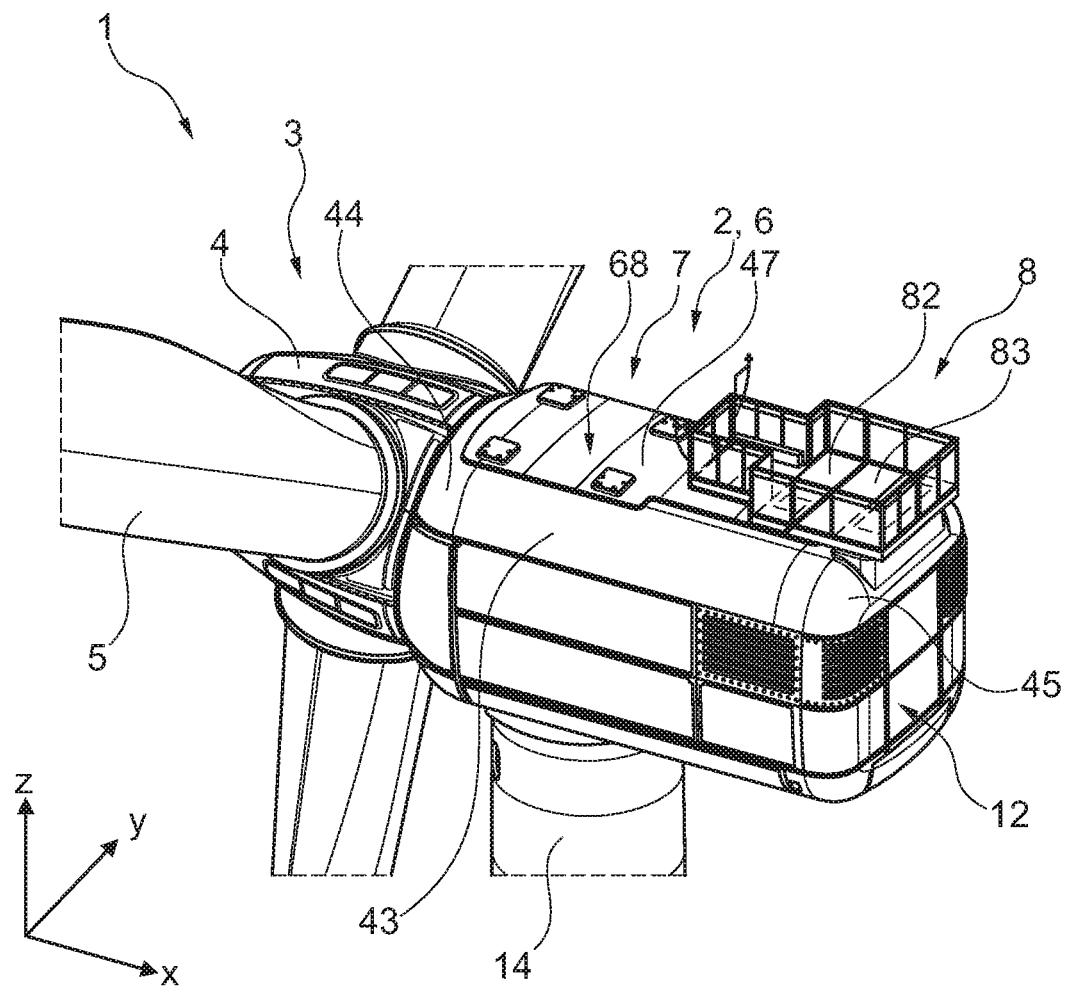
FIG. 1 is a simplified perspective view of a wind driven power plant comprising a helicopter hoisting platform.

FIG. 1 shows a simplified perspective view of a wind driven power plant 1 comprising a helicopter hoisting platform 8. The wind driven power plant 1 comprises a nacelle 2 and a rotor 3 having a hub 4 and rotor blades 5. The nacelle 2 extends in a vertical direction Z, which is substantially parallel to the axial extension of a supporting structure, in particular a tower 14 on which the nacelle 2 can be mounted. The nacelle 2 also extends in a horizontal plane defined by a longitudinal direction X, which is substantially parallel to a drive train to be located in the nacelle, and a transversal direction Y. The longitudinal direction X and the transversal direction Y are both perpendicular to the vertical direction Z and to each other.

A helicopter hoisting platform 8 for a nacelle 2 of a wind driven power plant 1 is supported on a rear end of the nacelle 2.

The helicopter hoisting platform 8 comprises a detachable portion 82 that is configured to be detached and removed from a permanent portion 83 of the helicopter hoisting platform 8.

A detachable portion 82 of the helicopter hoisting platform 8 is mounted on top of access hatches/nacelle roof openings 68.

The helicopter hoisting platform 8 is supported on the nacelle roof 7 in an overlapping configuration such that the helicopter hoisting platform 8 (or rather the detachable portion 82 of the helicopter hoisting platform 8) overlaps an opening cover 68 and/or an opening in the roof 7 of the nacelle 2.

The helicopter hoisting platform 8 is positioned at the minimum allowed distance between the centre of the winching area 84 and the rotor blade 5 trailing edge. In this position the detachable portion of the helicopter hoisting platform 8 is overlapping with the rooftop opening 68 and can be removed when needed.

A helicopter hoisting platform 8 having a removable portion 82 can be mounted on the nacelle 2 at the minimum allowed distance from the trailing edge of the rotor blade 5.

The helicopter hoisting platform 8 substantially ends flush with the rear wall 12 of the nacelle 2. Reducing the overall length of component groupings that are transported together further saves costly space on a ship.

Parts of the helicopter hoisting platform 8, which are projecting behind the rear wall 12 the nacelle 2 are therefore limited. This avoids unwanted cantilever reactions, which would result in a need for bigger/sturdier and heavier support elements.

Technical staff and material can be hoisted onto the hoisting platform 8 from a helicopter.

The nacelle roof 7 of the nacelle 2 comprises a plurality of panels 43-45, 47 made of a composite. The panels 43-45, 47 are connected to each other by means of connection flanges. The panels are configurable to provide openings of different sizes and shapes to the nacelle 2 by detaching and removing one or more inner roof panels 47.

The term "detachable" in this context should be understood to describe panels and roof sections (which are distinct combinations of connected panels) that can be fully detached from the remaining part (e.g. the outer roof panels 43-45) of the nacelle 2 in an easy and convenient way. As such, removable and detachable panels 47 and/or center roof sections are configured to be physically lifted away from the nacelle 2, e.g. by a lifter, crane or helicopter and placed at ground level, e.g. on the ground surface or a jack-up barge. Sliding or revolving panels or roof sections which are not conceived to be easily and conveniently fully detachable from the nacelle 2 are therefore not considered to be removable and detachable within the meaning of this description.

In other words, a detachable connection is configured for recurring engagement and disconnection. The detachable connection is not constructed for single-time and/or permanent (or at least long lasting) engagement.

A permanent connection, on the other hand, is configured for single-time and/or permanent (or at least long lasting) engagement. Stated differently, the permanent connection is not constructed for a recurring engagement and disconnection.

For example, a welded connection is obviously considered to be a permanent connection.

A screwed connection, however, can be considered to form a detachable connection as well as a permanent connection, depending on the configuration and the intended purpose.

A screwed connection secured by a safety cotter pin, for example, may be configured for easy and convenient detachment (and reattachment). The same applies to a screwed connection comprising a low-strength liquid bolt retaining compound (such as "Loctite® 221", "Loctite® 222" or comparable), which may be reapplied after every detachment.

A screwed connection comprising a medium-strength liquid bolt retaining compound (such as "Loctite® 243" or comparable) or a high-strength liquid bolt retaining compound (such as "Loctite® 270", "Loctite 276®" or comparable), however, forms a permanent connection, even if such a connection can still be detached, for example by using solvents, a heat treatment, or special tools.

The nacelle cover 6 protects the drive train 31 and other internal components of the wind power installation 1 from harsh environmental conditions and in particular moisture.

The nacelle 2 comprises a support frame 15. The nacelle cover 6 is coupled to the support frame 15, particularly in lateral regions of the nacelle 2. The nacelle roof 7 is self-supported. This means that the self-supported nacelle roof 7 extends, while being unsupported by the support frame 15, at least in a center section of the roof 7 (comprising the inner roof panels 47) from a first lateral side of the nacelle 2 to a second lateral side of the nacelle 2.

A top section of the framework structure is kept free of transversal and/or longitudinal beams in order to provide an upper passageway for insertion, removal and replacement of components. No intermediate beams or truss members project over the drive train. The main shaft assembly 29, the gear box 28, and/or the generator 30 can be inserted into the nacelle 2 or removed from the nacelle 2 via the opening in the roof 7 and the upper passageway in a top section of the framework structure if the detachable roof panels and the detachable portion 82 of the helicopter hoisting platform are detached and removed in accordance with the aspects of embodiments of the present invention.

The composite cover 6 of the nacelle 2 is configured and reinforced to support the helicopter hoisting platform 8 with the minimum necessary interconnections. The nacelle cover 6 is self-supporting the helicopter hoisting platform 8, therefore abandons the need for an additional underlying support structure 15.

The composite can be a fiber reinforced polymer. In particular, the fiber reinforced polymer can be a glass fiber reinforced polymer (GFRP). A glass fiber reinforced polymer, also known as "Fiberglass" or "fiberglass" is a type of fiber-reinforced plastic where the reinforcement fiber is specifically glass fiber. The glass fiber may be randomly arranged, flattened into a sheet (called a chopped strand mat), or woven into a fabric. The polymer matrix may be a thermoset polymer matrix, most often based on thermosetting polymers such as epoxy, polyester resin, or vinylester, or a thermoplastic. The glass fibers are made of various types of glass depending upon the fiberglass use. These glasses all contain silica or silicate, with varying amounts of oxides of calcium, magnesium, and sometimes boron. Other common names for fiberglass are glass-reinforced plastic (GRP), glass-fiber reinforced plastic (GFRP) or GFK (from German: Glasfaserverstärkter Kunststoff). Because glass fiber itself is sometimes referred to as "fiberglass", the composite is also called "fiberglass reinforced plastic." The present description also uses the term "composite" for GFRP or GRP. This aspect reduces the overall weight of the nacelle.

A wind park can comprise a plurality of the depicted wind driven power plants 1 comprising the nacelle 2 having a helicopter hoisting platform 8 according to aspects and embodiments of the invention.

Figure 2A:
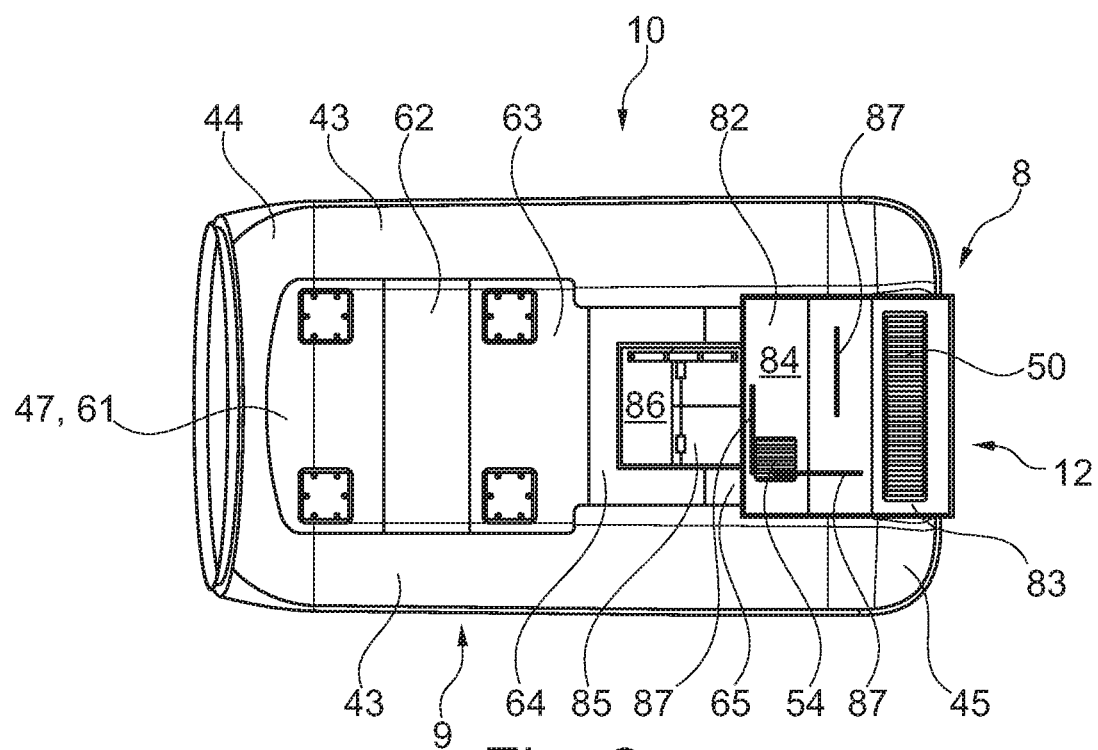
FIG. 2a is a simplified top view of a nacelle comprising a first embodiment of the helicopter hoisting platform.

FIG. 2a shows a simplified top view of a nacelle 2 from above, comprising a first embodiment of the helicopter hoisting platform 8.

The detachable portion 82 and the permanent portion 83 cooperatively form a winching area 84 (also known as clear area) of the helicopter hoisting platform 8.

The permanent portion 83 of the winching area 84 needs not to be removed before opening the nacelle roof 7.

The detachable portion 82 of the helicopter hoisting platform 8 comprises an access route area 85 and a safety zone area 86.

The helicopter hoisting platform 8 comprises an access hatch 50 in the winching area 84.

The helicopter hoisting platform 8 further comprises a supply hatch 54 in the winching area 84.

Tuck away deck cranes 87 can be detached and removed from the winching area 84. The tuck away deck cranes 87 are stored inside the nacelle 2, when not in use.

Figure 2B:
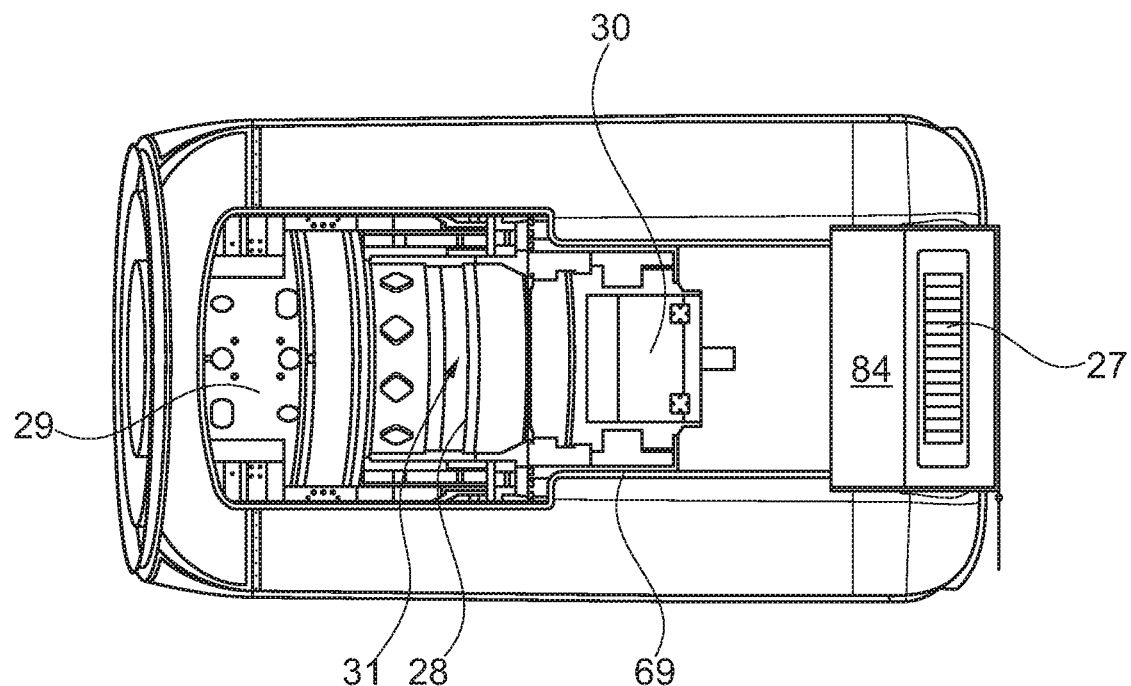
FIG. 2b is a simplified top view the nacelle, having a detachable part of the nacelle roof and a detachable portion of the helicopter hoisting platform removed.
Figure 2C:
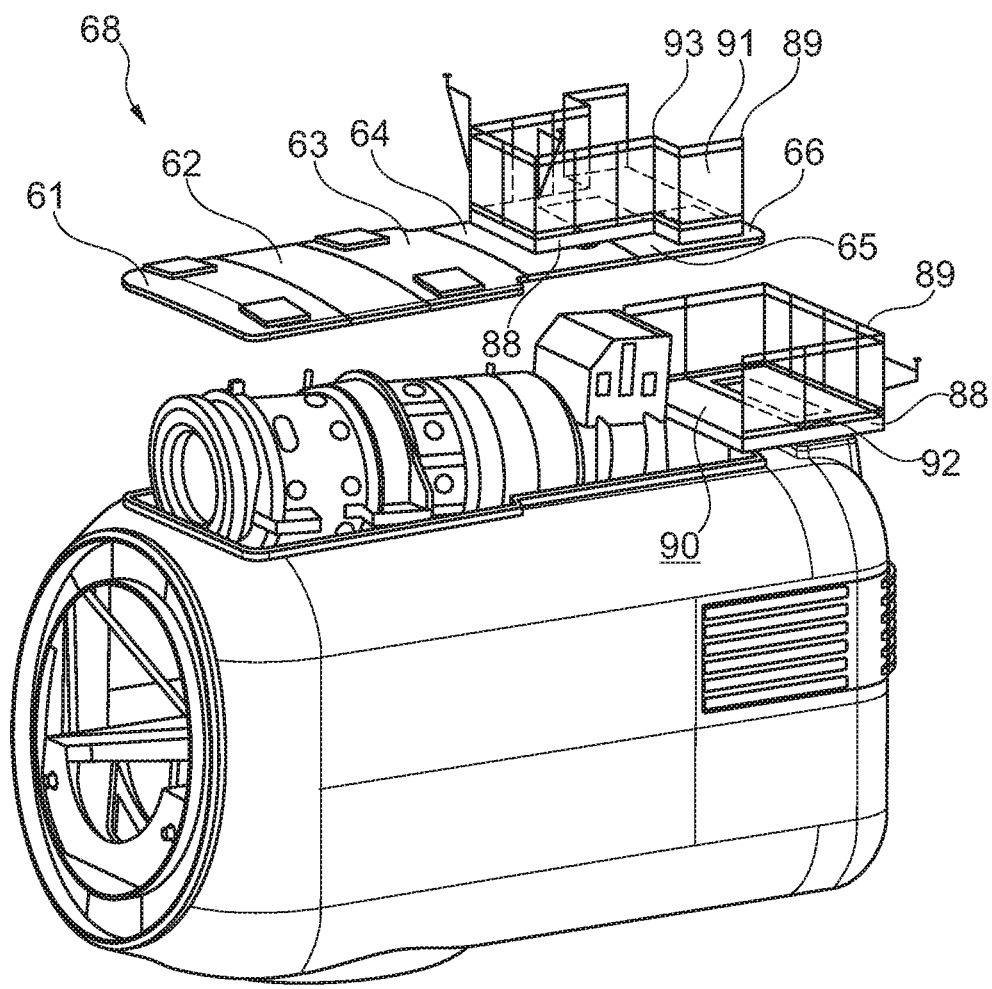
FIG. 2c is a simplified perspective view of the nacelle, having a detachable part of the nacelle roof and a detachable portion of the helicopter hoisting platform removed.

The inner roof panels 61-66 are configurable to provide an opening in the nacelle roof 7, the opening having a size and shape suitable for inserting/removing a complete drive train 31 of the wind driven power plant 1 (compare FIG. 2c).

The nacelle roof 7 is considered to be self-supported and supported by the lateral nacelle side walls 9, 10, the nacelle rear wall 12 and/or the support frame 15. Accordingly, the nacelle roof 7 is only supported along sections of its outer (lower) circumference. Therefore, the nacelle roof 7 is unsupported by the support frame 15 in a central area.

Basically, the nacelle roof 7 comprises four outer roof panels (two outer lateral roof panels 43, one outer front roof panel 44, and one outer rear roof panel 45). The outer roof panels are supported by the lateral nacelle side walls 9, 10 and the nacelle rear wall 12.

The nacelle roof 7 comprises six inner roof panels 61-66 in a central/inner area of the nacelle roof. All inner roof panels 61-66 extend in the transversal direction Y. The respective inner roof panels 61-66 therefore have a greater width along the transversal direction Y than a length along the longitudinal direction X. This configuration provides an exceptionally strong and sturdy self supported nacelle roof 7. The inner roof panels 61-66 extend over the inner/central area of the nacelle roof 7 and are supported on both lateral sides on the outer lateral roof panels 43.

Accordingly, the inner roof panels 61-66 are arranged one-after-the-other along the longitudinal direction. That is, the first inner roof panel 61 is closest to the rotor 3 of the wind driven power plant 1, the sixth inner roof panel 66 is furthest from the rotor 3.

Inner roof panels 64, 65 in a rear area (closer to the rear end of the nacelle 2) comprise platform supports 52 for supporting the helicopter hoisting platform 8. A fourth inner roof panel 64 comprises two platform supports 52' arranged along the transversal direction Y. A fifth inner roof panel 65 comprises a platform support 52' arranged in a first lateral region of the inner roof panel.

The fifth inner roof panel 65 in the rear area further comprises a supply/service hatch 54 that is configured for lifting in and/or hauling out supplies and tools for maintenance and installation work. The service hatch is arranged in a second lateral rear region of the inner roof panel 65.

Accordingly, the fifth inner roof panel 65 comprises the platform support 52 and the service hatch 54 arranged along the transverse direction Y.

The fourth inner roof panel 64 is closer to the rotor 3 of the wind driven power plant 1 than the fifth inner roof panel 65.

The outer rear roof panel 45 comprises an access hatch 50 configured for maintenance personnel to enter/exit the nacelle through the access hatch 50.

The outer rear roof panel 45 comprises two frontal and two lateral platform supports.

The access hatch 50 is arranged in a central portion of the outer rear roof panel 45. The access hatch has an elongated substantially rectangular shape that is arranged in the transversal direction. In other words: The long side of the access hatch 50 extends from lateral side to lateral side of the nacelle (in Y direction). This aspect provides enough head room to install a staircase instead of a ladder in the access hatch.

The platform supports 52 of the outer rear roof panel 45 are arranged along the frontal and lateral sides of access hatch 50.

FIG. 2b shows a simplified top view the nacelle 2, having a detachable part 68 of the nacelle roof 7 and a detachable portion 82 of the helicopter hoisting platform 8 removed. The whole drive train 31 comprising a main shaft assembly 29, a planetary gearbox 28, and a generator 30 can be removed and/or inserted through the opening 69.

FIG. 2c shows a simplified perspective view of the nacelle, having the detachable part 68 of the nacelle roof 7 and the detachable portion 82 of the helicopter hoisting platform 8 removed.

The nacelle 2 comprises an opening 69 that can be closed by a removable opening cover 68. The removable opening cover 68 and the detachable portion 82 of the helicopter hoisting platform 8 are configured to provide an open space when detached and/or removed. The open space may particularly be defined by the shape and size of the opening 69. The open space can be adapted for inserting/removing a generator 30 or a complete drive train 31 of the wind driven power plant 1. In other words: The detachable portion of the helicopter hoisting platform 8 can be removed to allow the extraction of parts 28-30 or the complete drive train 31 through a rooftop opening 69.

The detachable portion 82 and the permanent portion 83 of the helicopter hoisting platform 8 each comprise a girder frame 88, a railing fence 89 and/or a grating floor 90.

The helicopter hoisting platform 8 comprises an aluminum and/or composite structure. The girder frame 88, the railing 93 and fence support elements 92 comprise extruded profiles. The fence panels 91 comprise aluminum perforated sheets and/or moulded fibreglass. The walkable flooring comprises an aluminum or moulded fibreglass grating.

The detachable portion 82 is permanently connected to one or more detachable roof panels 47, 61-66 of the nacelle. Stated differently, the removable section of the helicopter hoisting platform is interconnected with the removable panels 47, 61-66 of the roof 7, such that the opening cover 68 and the detachable portion of the helicopter hoisting platform 82 can be removed together in one lift.

For removing the detachable panels 47, 61-66 and the detachable portion 82 of the helicopter hoisting platform, only the (detachable) bolts attaching the detachable portion of the helicopter hoisting platform to the permanent portion of the helicopter hoisting platform, need to be removed.

Figure 3A:
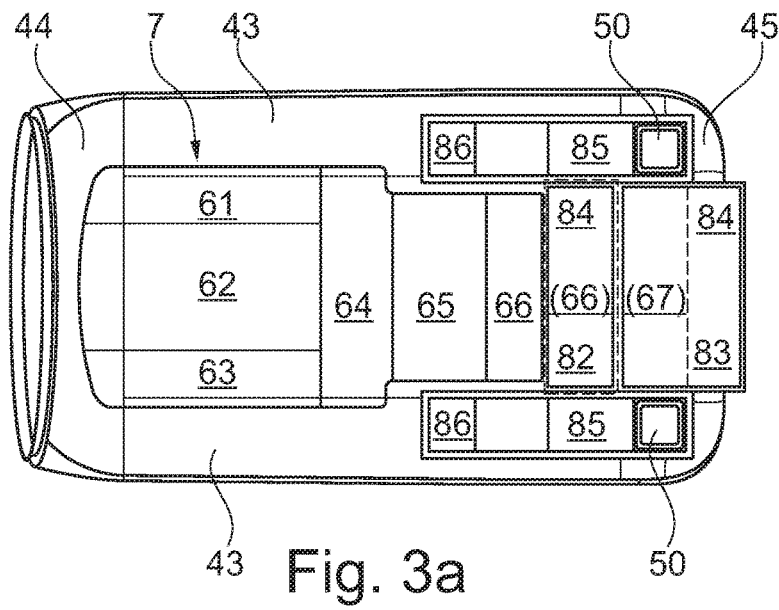
FIG. 3a is a simplified top view of a nacelle comprising a second embodiment of the helicopter hoisting platform.

FIG. 3a shows a simplified top view of a nacelle comprising a second embodiment of the helicopter hoisting platform.

The permanent portion 83, however, comprises the access route area 85 and/or the safety zone area 86.

The helicopter hoisting platform 8 also comprises two access hatches in the access route area 85.

The inner roof panels 61-67 of the nacelle roof 7 are configurable to provide an opening in the nacelle roof 7. The opening has a size and shape suitable for inserting/removing the complete drive train 31 of the wind driven power plant 1.

The nacelle roof 7 is considered to be self-supported by the lateral nacelle side walls 9, 10, the nacelle rear wall 12 and/or the support frame. Accordingly, the nacelle roof 7 is only supported along sections of its outer (lower) circumference. Therefore, the nacelle roof 7 is unsupported by the support frame in a central area.

Basically, the nacelle roof 7 comprises four outer roof panels (two outer lateral roof panels 43, one outer front roof panel 44, and one outer rear roof panel 45). The outer roof panels are supported by the lateral nacelle side walls 9, 10 and the nacelle rear wall 12.

The nacelle roof 7 comprises seven inner roof panels 61-67 in a central/inner area of the nacelle roof.

Inner roof panels 64-67 extend in the transversal direction Y. The inner roof panels 64-67 extend over the inner/central area of the nacelle roof 7 and are supported on both lateral sides on the outer lateral roof panels 43.

Inner roof panels 61-63 extend in the longitudinal direction X. The first to third inner roof panels 61-63 are closest to the rotor 3 of the wind driven power plant 1. The seventh inner roof panel 67 is furthest from the rotor 3.

The detachable portion 83 of the helicopter hoisting platform 8 overlaps at least the sixth and seventh inner roof panel 66, 67.

The first to fourth inner roof panels 61-64 have a greater width along the transversal direction than the fifth to seventh inner roof panel 65-67.

The sixth inner roof panel 66 in the rear area further comprises a supply/service hatch 54 that is configured for lifting in and/or hauling out supplies and tools for maintenance and installation work. The service hatch is arranged in a lateral rear region of the inner roof panel 66.

The grating 90 of the helicopter hoisting platform 8 has to be removed above the service hatch 54 in order to open the hatch.

The outer lateral roof panels 43 each comprise, in a rear region, two platform supports 52 for supporting a helicopter hoisting platform 8.

The outer rear roof panel 45 comprises two central platform supports 52 and two lateral access hatches 50 configured for maintenance personnel to enter/exit the nacelle through the access hatches 50. The access hatches 50 have a substantially square shape.

Figure 3B:
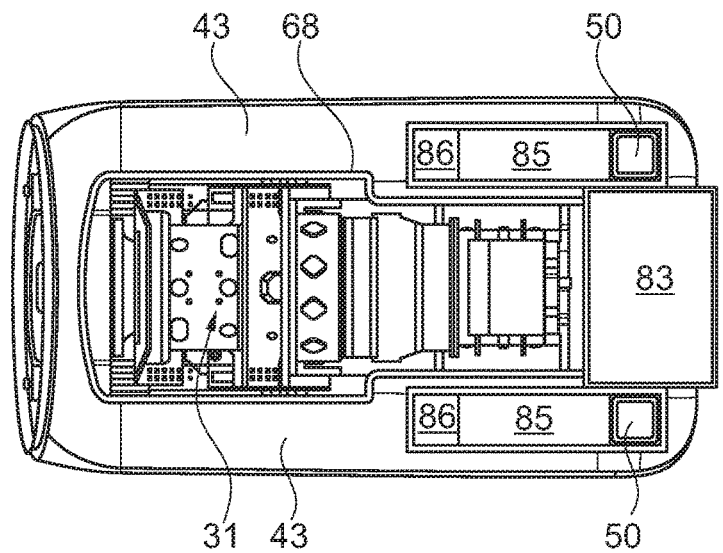
FIG. 3b is a simplified top view of the nacelle, having a detachable part of the nacelle roof and a detachable portion of the helicopter hoisting platform removed.
Figure 3C:
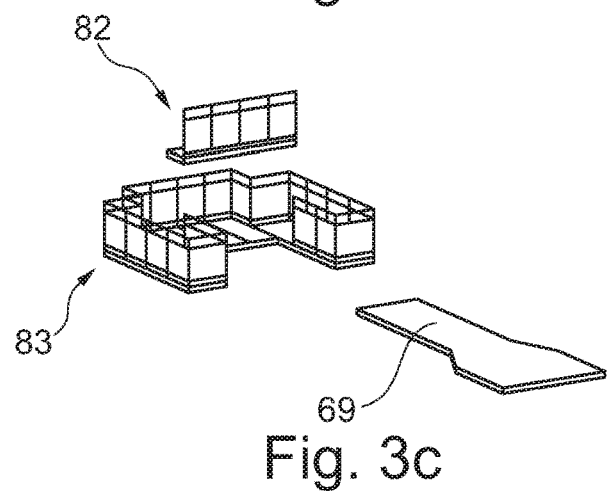
FIG. 3c is a simplified perspective view of the second embodiment of the helicopter hoisting platform.

FIG. 3b and FIG. 3c show simplified top and perspective views of the nacelle 2, having a detachable part 69 of the nacelle roof 7 and a detachable portion 82 of the helicopter hoisting platform removed. FIG. 3c shows a simplified perspective view of the second embodiment of the helicopter hoisting platform.

A rectangular portion of the winching area 84 in between the access route area 85 and the safety zone areas 86 forms the detachable portion of the helicopter hoisting platform 8.

The safety zone area 86 and the access route area 85 are arranged on the outer lateral roof panels 43.

Figure 4A:
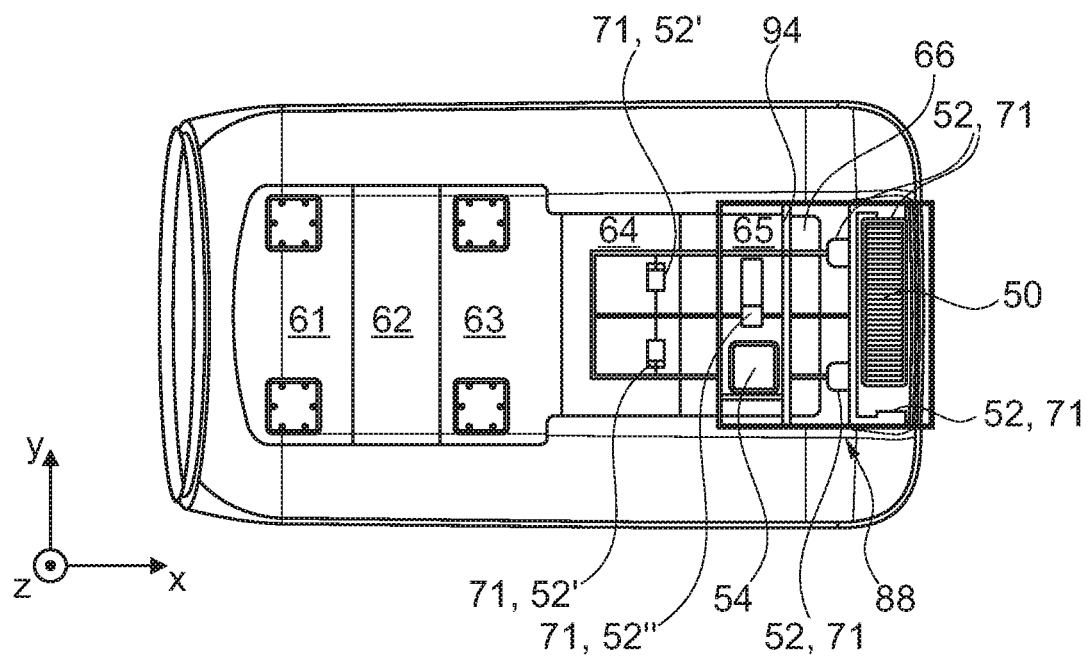
FIG. 4a is a simplified top view of a girder frame of the first embodiment of the helicopter hoisting platform.

FIG. 4a shows a simplified top view of a girder frame 88 of the first embodiment of the helicopter hoisting platform 8.

The detachable portion 82 is permanently connected to one or more detachable roof panels 64, 65 of the nacelle roof 7 by connection means 71 (platform interfaces).

The detachable portion 82 further comprises connection means 71 (platform interfaces) configured to form a permanent connection with an underlying detachable inner roof panel 64, 65 of the nacelle 2. The permanent connection can, for example, be a riveted connection or a screwed connection.

In other words: The detachable portion of the helicopter hoisting platform is interconnected with the removable panels of the roof 7, such that botch can be removed or reapplied together in one lift.

The permanent portion 83 comprises connection means 71 (platform interfaces) configured to form a permanent connection with an underlying outer rear roof panel 45. The permanent connection can, for example, be a riveted connection or a screwed connection.

The permanent connection is configured for single-time and/or permanent (or at least long lasting) engagement. Stated differently, the permanent connection is not constructed for a recurring engagement and disconnection.

The detachable connection is configured for recurring engagement and disconnection. Stated differently, the detachable connection is not constructed for single-time and/or permanent (or at least long lasting) engagement.

The girder frame 88 comprises frame trusses extending in the longitudinal direction X and frame trusses extending in the transversal direction Y. Differently stated, comprises the girder frame 88 framework segments of rectangular and/or substantially square shape.

The framework segments are configured to surround (i.e. not extend over) the hatches 50, 54.

The detachable portion 82 has three abutments (supports) that are substantially arranged in a triangle spanning large parts of the detachable portion. The permanent portion 83 has four abutments (supports) that are substantially arranged in a rectangular arrangement spanning large parts of the permanent portion. Therefore, both portions are well supported.

The detachable portion 82 and the permanent portion 83 can be connected by a detachable connection, i.e. a screwed connection or in particular a spring catch. However, alternatively, the detachable portion 82 and the permanent portion can be configured to be independent from each other, i.e. not connected.

Therefore, the detachable portion 82 and the permanent portion 83 can be separated or separable at a split line 94.

The size of the helicopter hoisting platform is approximately 15 m$^2$.

Figure 4B:
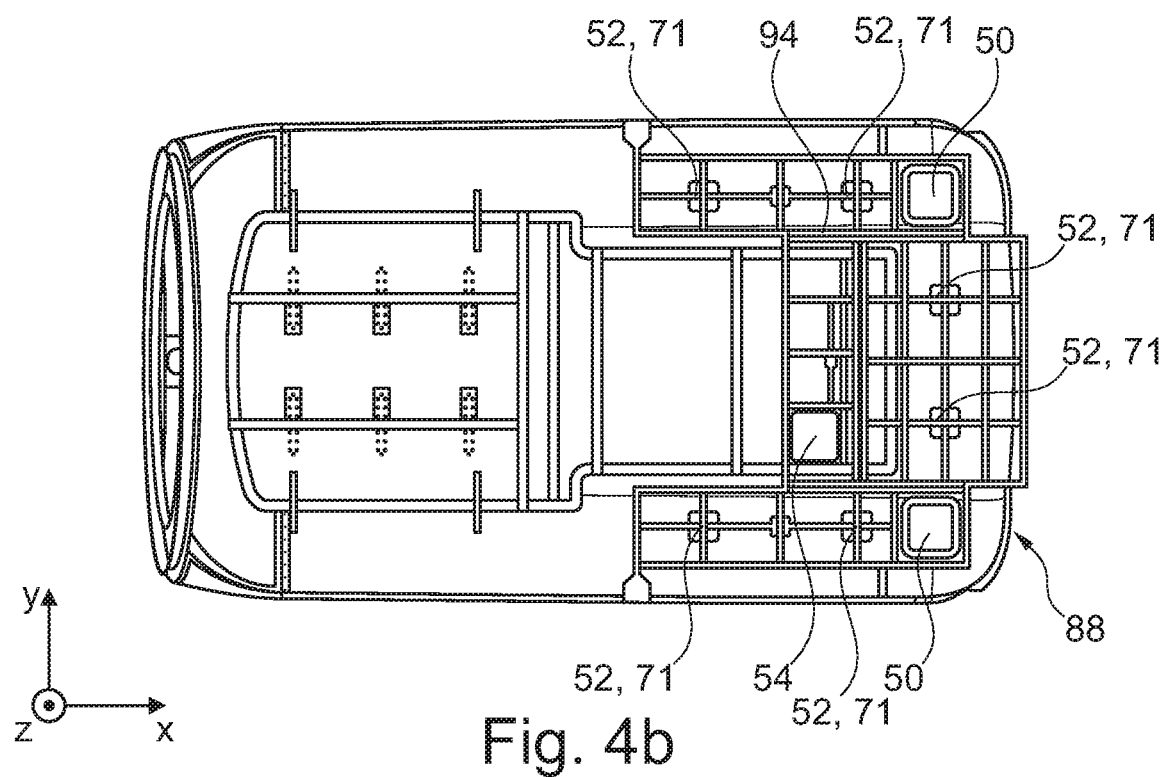
FIG. 4b is a simplified top view of a girder frame of the second embodiment of the helicopter hoisting platform.

FIG. 4b shows a simplified top view of a girder frame of the second embodiment of the helicopter hoisting platform.

The detachable portion 82 of the helicopter hoisting platform 8 may solely comprise connection means configured to form a detachable connection with the permanent portion of the helicopter hoisting platform. In other words: The detachable portion of the helicopter hoisting platform 8 is not connected to the detachable and removable opening cover 68.

The permanent portion 83 comprises connection means 71 (platform interfaces) configured to form a permanent connection with underlying outer (lateral and/or rear) roof panels 43, 45. The permanent connection can, for example, be a riveted connection or a screwed connection.

The girder frame 88 comprises frame trusses extending in the longitudinal direction X and frame trusses extending in the transversal direction Y. Differently stated, comprises the girder frame 88 framework segments of rectangular and/or substantially square shape.

The framework segments are configured to surround (i.e. not extend over) the hatches 50, 54. The grating 90 overlapping the support hatch 54, however, has to be removed before the support hatch becomes accessible.

The permanent portion 83 has two abutments (supports) on each outer lateral roof panel 43 of the nacelle, and two more abutments that are arranged on the outer rear roof panel 45. Accordingly, the abutments are arranged in a rectangular arrangement spanning large parts of the permanent portion.

The detachable portion 82 is, however, not connected to an underlying panel, solely supported by the permanent portion 83.

The detachable portion 82 and the permanent portion 83 therefore have to be coupled by a detachable connection, i.e. a screwed connection.

Therefore, the detachable portion 82 and the permanent portion 83 have to be separable at a split line 94.

The size of the helicopter hoisting platform 8 is approximately 9 m$^2$ larger than the first embodiment.

Figure 5A:
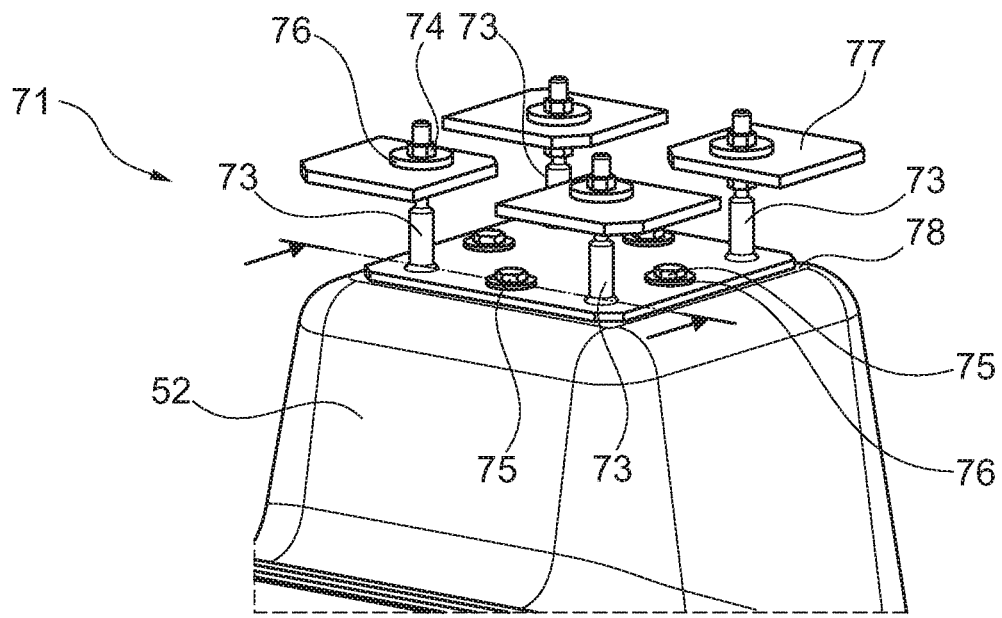
FIG. 5a is a simplified perspective view of a platform support.
Figure 5B:
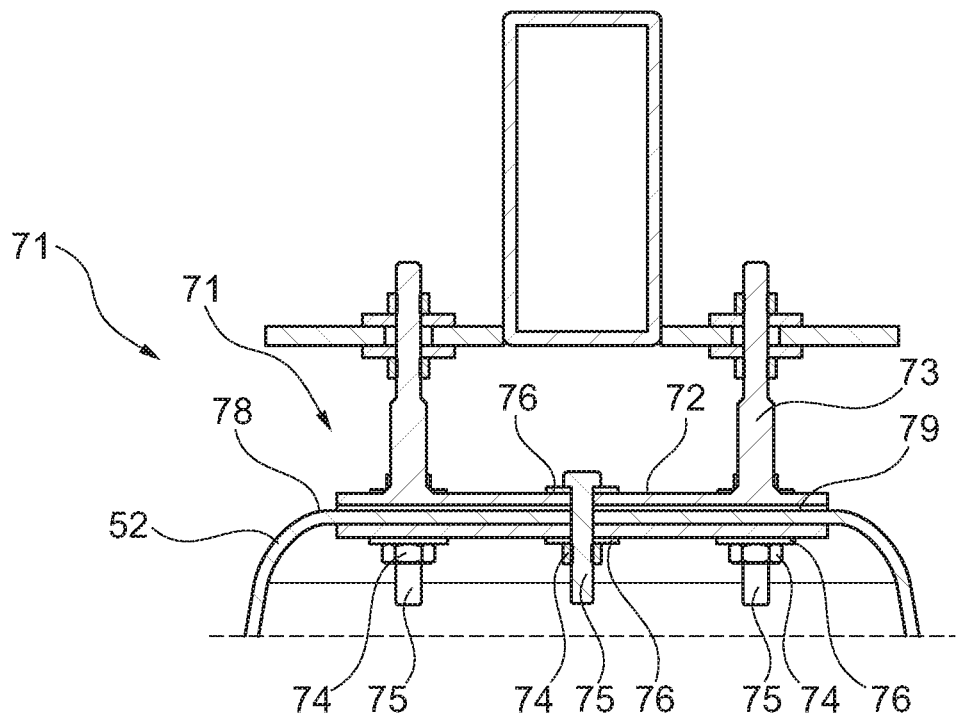
FIG. 5b is a simplified cross-sectional view of the platform support.

FIG. 5a shows a simplified perspective view of a platform support, and FIG. 5b shows a simplified cross-sectional view of the platform support.

Platform interfaces 71 are attached to the platform supports 52 of the nacelle roof 7. The platform interfaces 71 between the helicopter hoisting platform 8 and the nacelle roof 7 are bolted to the girder frames 88. The connections are permanent and require only regular inspection and maintenance.

The outer rear roof panel 45 and/or outer lateral roof panels 43 and/or inner roof panels 64, 65 comprise supports 52 for supporting a helicopter hoisting platform 8. Shown is a platform support 52 that is integral to the outer lateral roof panels 43 of the nacelle roof cover 7 depicted in FIG. 4b. The other platform supports 52, however, have a similar mechanical construction.

The platform supports 52 are portions of the nacelle roof 7, and in particular protruding portions of the outer lateral 43 and/or outer rear roof panels 45 and/or portions of the inner roof panels 64, 65. The platform supports 52 are an integral part of the self-supporting nacelle roof 7.

All platform supports 52 of a nacelle 2 comprise a respective (flat) upper support surface 78. The upper surfaces 78 are arranged in a mutual horizontal plane.

A gasket 79 between the upper support surface 78 and platform interface 71 prevents potential pressure peaks resulting from imperfections in the support surface 78 or the platform interface 71. The gasket 79 also prevents water from leaking into the nacelle 2.

The platform interface 71 comprises a (metallic) base plate 72. The base plate 72 can have a rectangular/square shape. Studs (bolts) 73 are arranged in an outer region of the base plate 72, particularly in the corners of the base plate. The studs 73 can be welded to the base plate 72. Alternatively, base plate 72 and studs 73 can form an integral casting. The studs 73 comprise an upper section (away from the base plate 72) having a reduced diameter (with respect to the lower section of the stud). The upper section of the studs 73 comprises screw threads. A counter plate 81 corresponds to the base plate 72. The base plate 72 and the counter plate 81 clamp (sandwich) the support surface 78 of the support platform 52.

Holes that are arranged in the base plate 72 in-between the studs 73 allow bolt connections being formed with the platform support 52, and more particularly with the counter plate 81. The bolt connections each comprise a bolt 75, washers 76 on both sides, and a nut 74 on the inside of the platform support 52.

The base plate 72 of the platform interface 71 is permanently attached (bolted) to the platform support 52, e.g. by using a liquid bolt retaining compound.

A lower nut 74, an upper nut 74, and metallic washers 76 on each stud 73 clamp (sandwich) a flange part of the helicopter hoisting platform 8 in-between. The flange part of the helicopter hoisting platform comprises a through-hole that is larger than the stud 73. The studs 73 are crossing through the holes in the flange part of the girder frame which are provided with a wider hole size for horizontal adjustment, whereas the thread on the studs 73 provides vertical adjustment.

This configuration also allows the manufacturing tolerances being compensated and the helicopter hoisting platform 8 being leveled independently of the nacelle roof 7.

Figure 6:
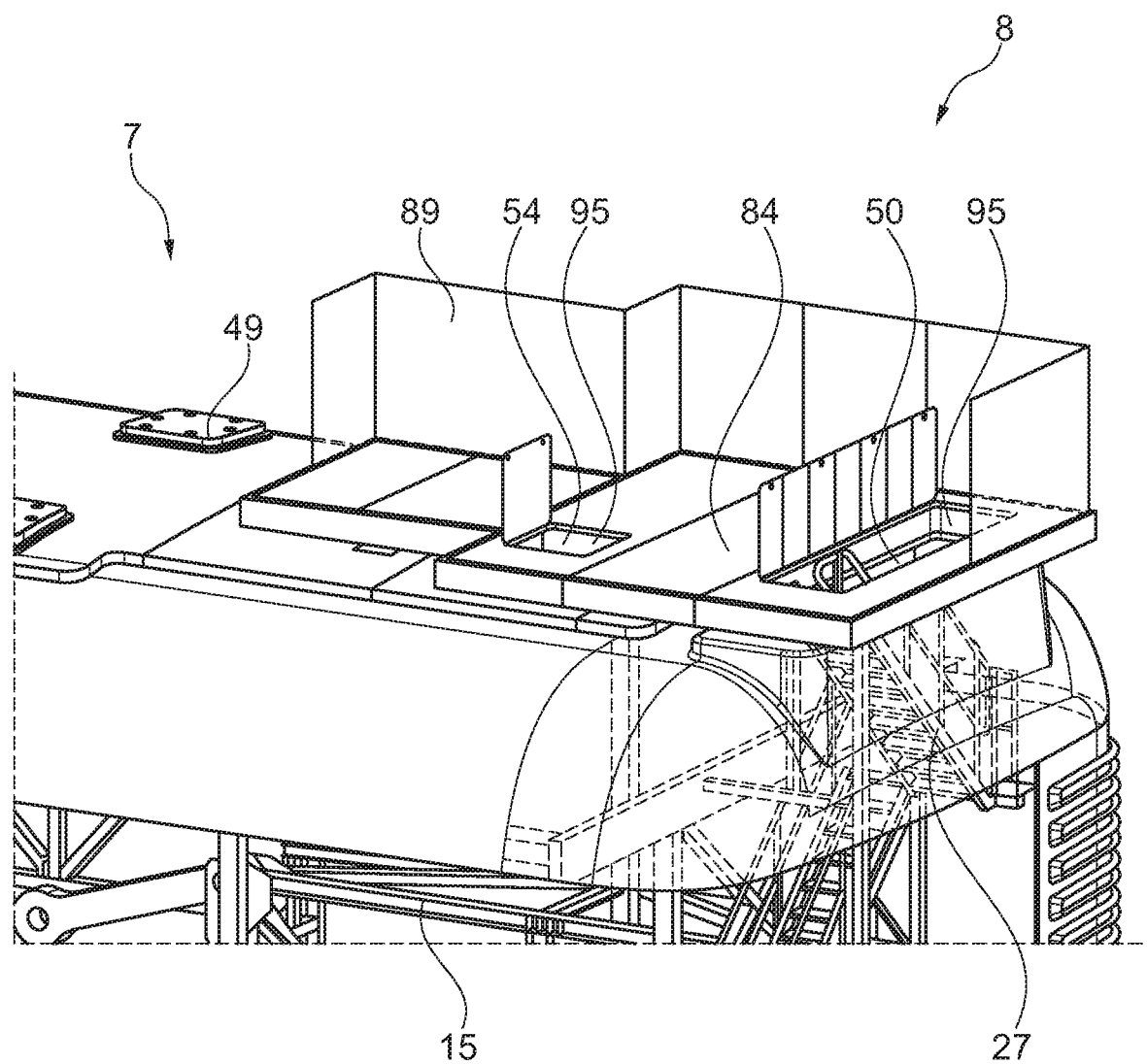
FIG. 6 shows a simplified perspective view of the first embodiment of the helicopter hoisting platform.

FIG. 6 shows a simplified perspective view of the first embodiment of the helicopter hoisting platform.

Some elements of the nacelle cover 6 and the railing fence 89 are hidden in this figure to provide a view into the rear part of the nacelle.

Whereas the first embodiment comprises lateral access hatches 50 for vertical ladders, the second embodiment comprises a rectangular centered access hatch for a 45° stairway 27.

Hatch adapter are configured to level the hatch covers 50, 54 with the walkable surface of the winching area 84.

The hatches are opened outward and rotated about the transversal direction Y towards the rotor 3. This arrangement provides for a minimal windage area exposed to the downwash of a helicopter hovering over the helicopter hoisting platform 8.

When closed, the hatches 50, 54 provide a walkable surface with anti-skid properties. Further, the hatch covers form an obstacle-free flat surface that is flush with the surrounding walkable area.

The respective hatch covers hermetically seal the corresponding hatches 50, 54 when closed.

Approximate hatch size of the access hatch 50 is 305 cm×85 cm.

The access hatch 50 is equipped with hinges, gas springs, locking devices and a sealing rubber (elastomeric) element.

The hatches 50, 54 can be hold locked in the open position by a locking mechanism.

At least the access hatch 50 (but most or all hatches 50, 54, 49) can be operated from the inside and the outside.

An upraised hatch adapter 95 levels the hatch covers 50, 54 with the surrounding walkable surface.

The approximate size of the support hatch is larger than 50 cm×50 cm and smaller than 2 m×2 m. In particular, the approximate size of the support hatch 54 is 75 cm×75 cm. The support hatch 54 is equipped with hinges, gas springs, locking devices and sealing rubber (elastomeric) element.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

EMBODIMENTS

A helicopter hoisting platform for a nacelle of a wind driven power plant, wherein the helicopter hoisting platform comprises a detachable portion and a permanent portion, wherein the detachable portion is configured to be detached and removed from the permanent portion of the helicopter hoisting platform.

The helicopter hoisting platform of embodiment 1, wherein the detachable portion and the permanent portion cooperatively form a winching area.

The helicopter hoisting platform of embodiment 1 or 2, wherein the detachable portion and the permanent portion each comprise a girder frame, a railing fence and a grating floor.

The helicopter hoisting platform of anyone of embodiments 1 to 3, wherein the detachable portion comprises an access route area and a safety zone area.

The helicopter hoisting platform of anyone of embodiments 1 to 3, wherein the permanent portion comprises an access route area and a safety zone area.

The helicopter hoisting platform of anyone of the preceding embodiments, wherein the helicopter hoisting platform comprises an access hatch in the winching area.

The helicopter hoisting platform of embodiment 4 or 5, wherein the helicopter hoisting platform comprises an access hatch in the access route area.

The helicopter hoisting platform of anyone of the preceding embodiments, wherein the helicopter hoisting platform comprises a supply hatch in the winching area.

The helicopter hoisting platform of anyone of the preceding embodiments, wherein the detachable portion comprises connection means configured to form a (permanent) connection with an underlying detachable inner roof panel of the nacelle.

The helicopter hoisting platform of anyone of embodiments 1 to 8, wherein the detachable portion solely comprises connection means configured to form a (detachable) connection with the permanent portion.

A wind driven power plant comprising a nacelle and the helicopter hoisting platform of anyone of the preceding embodiments.

The wind driven power plant of embodiment 11, wherein the nacelle comprises an opening that can be closed by a removable opening cover, wherein the removable opening cover and the detachable portion are configured to provide an open space when detached and/or removed, wherein the open space, particularly defined by the shape and size of the opening, is adapted for inserting/removing a generator or a complete drive train of the wind driven power plant.

The wind driven power plant of embodiments 11 or 12, wherein the detachable portion is (permanently) connected to one or more detachable roof panels of the nacelle.

A wind park comprising a plurality of wind power driven power plants according to anyone of embodiments 11 to 13.

The invention claimed is:

1. A helicopter hoisting platform for a nacelle of a wind driven power plant, the helicopter hoisting platform comprising: a detachable portion and a permanent portion permanently supported on a nacelle roof, wherein the permanent portion is permanently supported on a first nacelle roof portion of the nacelle roof, wherein the detachable portion is supported on a second nacelle roof portion of the nacelle roof and is configured to be detached and removed from the permanent portion of the helicopter hoisting platform and is configured for recurring engagement and disconnection from the second nacelle roof portion, and the detachable portion overlaps an opening cover for an opening in the nacelle roof.

2. The helicopter hoisting platform of claim 1, wherein the detachable portion and the permanent portion cooperatively form a winching area.

3. The helicopter hoisting platform of claim 1, wherein the detachable portion and the permanent portion each comprise a girder frame, a railing fence and a grating floor.

4. The helicopter hoisting platform of claim 1, wherein the detachable portion comprises an access route area and a safety zone area.

5. The helicopter hoisting platform of claim 1, wherein the permanent portion comprises an access route area and a safety zone area.

6. The helicopter hoisting platform of claim 1, wherein the helicopter hoisting platform comprises an access hatch in a winching area.

7. The helicopter hoisting platform of claim 4, wherein the helicopter hoisting platform comprises an access hatch in an access route area.

8. The helicopter hoisting platform of claim 1, wherein the helicopter hoisting platform comprises a supply hatch in a winching area.

9. The helicopter hoisting platform of claim 1, wherein the detachable portion comprises platform interfaces configured to form a permanent connection with an underlying detachable inner roof panel of the second nacelle roof portion.

10. The helicopter hoisting platform of claim 1, wherein the detachable portion comprises platform interfaces configured to form a detachable connection with the permanent portion.

11. A wind driven power plant comprising a nacelle and the helicopter hoisting platform of claim 1.

12. The wind driven power plant of claim 11, wherein the nacelle comprises an opening that can be closed by a removable opening cover, wherein the removable opening cover and the detachable portion are configured to provide an open space when detached and/or removed, wherein the open space, defined by a shape and a size of the opening, is adapted for inserting or removing a generator or a complete drive train of the wind driven power plant.

13. The wind driven power plant of claim 11, wherein the detachable portion is permanently connected to one or more detachable roof panels of the nacelle.

14. A wind park comprising a plurality of wind power driven power plants according to claim 11.

* * * * *